United States Patent [19]

Harada et al.

[11] Patent Number: 5,905,891
[45] Date of Patent: *May 18, 1999

[54] PROGRAMMABLE CONTROLLER HAVING DIRECTLY EXECUTABLE CPU INSTRUCTIONS

[75] Inventors: Toshio Harada; Kazuhiro Kudo, both of Aichi, Japan

[73] Assignee: Mitsubishi Denki Kabushiki Kaisha, Tokyo, Japan

[ * ] Notice: This patent is subject to a terminal disclaimer.

[21] Appl. No.: 08/376,310

[22] Filed: Jan. 23, 1995

Related U.S. Application Data

[63] Continuation of application No. 08/008,629, Jan. 25, 1993, Pat. No. 5,386,569.

[30] Foreign Application Priority Data

Jan. 23, 1992 [JP] Japan ..................................... 4-010176

[51] Int. Cl.$^6$ ......................................................... G06F 9/45
[52] U.S. Cl. ........................................... 395/705; 395/707
[58] Field of Search ..................................... 395/705, 707

[56] References Cited

U.S. PATENT DOCUMENTS 4,282,584  8/1981  Brown et al. ............................ 364/900

FOREIGN PATENT DOCUMENTS

| | | |
|---|---|---|
| A 0 236 828 | 9/1987 | European Pat. Off. . |
| A 0 331 060 | 9/1989 | European Pat. Off. . |
| 60-237 542 | 11/1985 | Japan . |
| 61-000 808 | 1/1986 | Japan . |
| 63-045 603 | 2/1988 | Japan . |
| 2-171 901 | 7/1990 | Japan . |
| 4-006 963 | 1/1992 | Japan . |

OTHER PUBLICATIONS

"Z80 Assembly Language Programming", L.A. Leventhal, Osborne & Assoc., Inc., pp. 2–11 to 2–13.

Primary Examiner—Tariq R. Hafiz
Assistant Examiner—Peter J. Corcoran, III
Attorney, Agent, or Firm—Sughrue, Mion, Zinn, Macpeak & Seas, PLLC

[57] ABSTRACT

A programmable controller (PC) which converts PC instructions directly into targeted CPU instructions, not into a macroprogram format, and stores them as an execution file. The PC stores restoration information for ladder display together with the CPU instructions, whereby the number of program steps to be executed is reduced and a ladder display can be provided. The PC also converts PC instructions written in the ladder language into restoration information restorable to the ladder language and generates them as a main processing restoration information file, then converts the PC instructions directly into targeted CPU instructions, not into a macroprogram format, on the basis of the restoration information file, and stores them as an execution file independently of the main processing restoration information file. Also, the execution file for sequence processing is separated from the main processing restoration information file for ladder display, ensuring that processing can be performed much faster without needing to judge whether a step is an execution instruction or display information. The PC incorporates conversion programs and conversion tables for generating finally required CPU instructions, whereby sequence programs can be developed in an environment where there is no computer for sequence program development. The use of such tables and programs permits function change and function addition to be made to the stored conversion tables using an accessory CRT/keyboard so that specifications can be changed as required.

18 Claims, 12 Drawing Sheets

PROGRAMMABLE CONTROLLER HAVING DIRECTLY EXECUTABLE CPU INSTRUCTIONS

This is a Continuation application of Ser. No. 08/008,629 filed Jan. 25, 1993, now U.S. Pat. No. 5,386,569.

BACKGROUND OF THE INVENTION

1. Field of the Invention

The present invention relates to a method and apparatus for the efficient operation of a programmable controller (hereinafter referred to as a "PC") under the programmed instructions of a processing unit (herein a "CPU") and, in particular, the generation of an execution file, the execution of such file and the display of information indicative of the instructions and processing carried out by the CPU.

2. Description of the Background Art

Programs for operating a PC which exercises sequence control ("sequence programs") are written with several different types of instructions, including (i) "basic instructions" for performing bit processing corresponding to relay operation, (ii) "function instructions" for implementing more complex operation and control, and (iii) other instructions.

These sequence programs are generally programmed as ladder diagrams in a ladder language, comprising the basic instructions, function instructions, and other instructions, with reference to a flowchart.

Programmable controllers for performing fast bit processing for sequence control were disclosed in Japanese Patent Publication No. 38902 of 1987 and Japanese Patent Publication No. 304302 of 1988. In these conventional controllers, however, their function instructions have a low processing speed. This is because the function instructions are developed in a macro-program and are software-processed. Furthermore, these PC instructions are subject to ladder display functions which result in low execution speeds.

The "ladder language" referred to herein is a programming language in which input/output signals are written with symbols, such as electrical circuit symbols that conventionally represent relay contacts and relay coils. Also, for example, a processing function such as "count up" is written with an instruction symbol (mnemonic) such as INC (Increment). The ladder language is suitable for user programming in an interactive form.

It should be noted that there are other languages in which such electrical circuit symbols are written with mnemonic instruction symbols, such as LD (Load) and LDI (Load Inverse), and processing functions are written similarly with mnemonic instruction symbols. These languages are adequate for programming employing a PC which does not have a graphic function and programming using a computer.

In a conventional processing operation, a sequence program written in a ladder language is converted into a "machine language" corresponding to the various instructions and is stored in a memory in the PC via a program input device. A CPU (central processing unit) is operative to read and execute each instruction step of the stored sequence program cyclically in sequence, thereby carrying out desired sequence control.

If it is desired to display the sequence program as a ladder diagram on a display device, such as a CRT (Cathode Ray Tube), the PC memory contains a converter program. The converter program sequentially reads the sequence program instructions written in the machine language from the memory, decodes them, outputs the ladder language corresponding to the machine language to the CRT, and displays it as a ladder diagram.

Such control will now be described with reference to FIG. 8 to FIG. 12.

FIG. 8 is a PC configuration diagram known in the art, wherein a CPU 1 is connected to a memory 2, that stores programs and information required for the PC to exercise control, via the direct connection of an address bus 3 for specifying memory addresses and the indirect connection of a data bus 4 for transferring data at the specified addresses of the memory. A bit operation instruction detector 5 is for detecting basic instructions which perform bit processing. A no-operation (NOP) instruction generator circuit 6 will return a response to the CPU 1 at the time of a basic instruction, the response NOP being via a sub-data bus 7 for inputting the output of the no-operation instruction generator circuit 6 to a selector. A bit operation processor 9 is for performing the processing of bit operation instructions as basic instructions and also connects to the CPU 1 via a system data bus 10, which also transfers data to and from the CPU 1 and each circuit and device. One such device is a digital input/output circuit 11 for inputting various signals and outputting processing results in response to sequence processing, which also is connected to a switch input 12, a relay contact input from a relay circuit 13, a lamp 14, and a relay coil 15. Another device connected to bus 10 is a keyboard 16 and a CRT acting as interfaces between the PC and an operator. A further device connected to bus 10 is a floppy disk drive 17 for storing various programs and data.

In the memory 2, there are a variety of sub-storage areas, including a control table 201 for storing data required for program processing of the PC, and an interrupt processing program 202 for carrying out processing, e.g., immediate reading of coordinate data initiated by an interrupt signal or the like in a measuring operation, etc.

First a control transition will be described in accordance with FIG. 9 by taking as an example the PC which is used with a numerical control (hereinafter referred to as "NC") apparatus. NC processing includes control which reads a machining program and moves a tool along a tool path specified by the machining program at a specified speed. The machining program consists of linear interpolation and circular interpolation commands for specifying the tool path and the tool compensation commands for compensating for tool dimensions, etc. Processing time depends on the combination of these commands, e.g., when only the linear interpolation command is used, the processing time is short, and when the circular interpolation and tool compensation commands are combined, the processing time is long. The processing time changes according to the control status and operation complexity.

In a NC processing environment, the PC is being operated under control of a main program "d". The control transition is started up by a reference interrupt signal "a". In response to the servicing of the interrupt, the PC first executes a program to be processed periodically in a cycle of the reference interrupt signal that was generated, i.e., a high-speed processing program "c". When this high-speed processing program ends, the PC carries out NC processing "e" (e.g., linear and circular interpolations, pulse distribution processing and the like) and thereafter resumes a main processing program "d", i.e., a sequence program, from where it had been stopped during the previous execution. After that, on occurrence of another reference interrupt signal "a", the PC stops the execution of the main processing "d" and executes the programs in a sequence of high-speed processing "c", NC processing "e" and the rest of main processing "d".

When an interrupt signal is input, the PC stops the currently executed NC processing program and runs an interrupt processing program "b", for example, for storing a memory content at a prodetermined address . When the a execution of this interrupt program ends, the PC resumes the previously stopped NC processing program from where it left off. unlike the high-speed processing "c" which runs the whole program every time it is started, the main processing "d", executes the program cyclically. At the end of each cycle of operation, it sometimes is stopped by another program of higher priorlty.

The operation of the PC will now be described with reference to the configuration in FIG. 8. The CPU 1 is started at predeter mined intervals (for instance, 7 msec) by a starting circuits not shown, which generates the reference interrupt signal, and specifies an address of the memory 2 via the address bus 3 to read the content of the memory 2 at the predetermined address.

At this time, the high-speed processing program 203 is first executed from its beginning. Such program could provide, for example, a position count control, etc., for a turret and an ATC (automatic tool changer) magazine of a machine tool (not shown) which are mounted with tools.

When the CPU 1 specifies the memory address via the address bus 3, the memory content at the corresponding address is read and output to the data bus 4. The memory content output onto data bus 4 is decoded by the bit operation instruction detector 5, which determines whether the content is a "basic instruction" for executing a bit operation or a "function instruction" for carrying out high-level operation processing.

When it has been determined that the content read is a basic instruction, a bit operation instruction detection signal is output to the NOP generator circuit 6, which then outputs a NOP code representing a no-operation instruction onto the sub-data bus 7. At this time, the bit operation instruction detection signal is also output from the bit operation instruction detector 5 to the selector 8, which then outputs onto the system data bus 10 the NOP code representing the no-operation instruction output onto the sub-data bus 7.

Further, the bit operation instruction detection signal is also output from the bit operation instruction detector 5 to the bit operation processor 9, which then performs processing, e.g., turns on/off a predetermined bit at the memory address specified by the basic instruction of the PC. In the meantime, the CPU 1 executes the no-operation instruction output onto the system data bus 10 and progresses to a step next to the basic instruction of the PC.

For a function instruction of the PC, the bit operation instruction processor 5 does not output the bit operation instruction detection signal. Hence, the selector 8 outputs the data content, which has been read from the memory 2 and output onto the data bus 4, intact onto the system data bus 10, and the CPU 1 executes programmed control by analyzing the data from selector 8.

The sequence program is thus executed in sequence, predetermined processing is carried out according to the states of various input signals, such as the switch input 12 and relay contact input 13, the lamp(s) 14 are lit and extinguished, and the relay coil(s) 15 are controlled on/off.

As a result, the spindle motor and other components of the machine tool controlled by the NC apparatus containing the PC are switched on/off, and forward/reverse rotation, coolant, etc., are controlled on/off.

Program conversion and control sequences in the conventional PC will now be described.

FIG. 10 illustrates a program conversion sequence in the conventional PC, FIG. 12 shows a flowchart for a data move instruction program and corresponding specific instruction examples, and FIG. 11 shows a program structure and a control sequence in the known PC. It should be noted that in FIG. 11, a memory width is represented and described in 32 bits for convenience.

Referring to FIG. 10, 211a indicates ladder language input data, which is input to a working RAM 211' by an operator from the keyboard/CRT 16 in FIG. 8 in accordance with a ladder diagram shown below 211a. The working RAM comprises a RAM (Random Access Memory), allowing data to be rewritten optionally.

A ladder language/intermediate language conversion program 207 reads a ladder program from the ladder language input data 211a sequentially, converts each step of the ladder program into an intermediate language separated into each component element with reference to a ladder language/intermediate language conversion table 208a, and generates an intermediate language file 211b in the working RAM 211'.

As a preliminary matter, the PC instructions that are referenced in the intermediate language file in FIG. 10 comprise the following:

"LD"—In the PC instructions, LD (short for "Load") is the basic instruction which reads the content of the specified bit on memory to the specified register and executes the subsequently commanded instruction if the result is "1".

For example, "LD M123" indicates that the content of the bit defined as M123 on memory is read to the register. Hence, if the content of the bit defined as M123 is "1", "1" is read to the register. Reversely, if the content of the bit is "0", "0" is read to the register. If the result is "1", the "MOVE D200 D100" instruction commanded subsequently is executed. Conversely, if the result is "0", "MOVE D200 D100" is skipped and the "LDI M100" instruction commanded subsequently to "MOVE D200 D100" is executed.

"LDI"—LDI (short for "Load Inverse") is the basic instruction which, like LD, reads the content of the specified bit on memory to the specified register. It is different from LD in that the inversed content of the bit is read. Therefore, "LDI M100" indicates that the inversed content of the bit defined as M100 on memory is read to the register.

In the example, if the content of the bit defined as M100 is "1", "0" is read to the register. By contrast, if the content of the bit is "0", "1" is read to the register. If the result is "1", the "INC D800" instruction commanded subsequently is executed. In contrast, if the result is "0", "INC D800" is skipped and the instruction (not shown) commanded subsequently to "INC D800" is executed.

"MOVE"—is the function instruction of the PC which transfers the content of an identified register to another identified register.

For example, "MOVE D200 D100" is the function instruction of the PC which transfers the content of the data register defined as D200 to the data register defined as D100."MOVE D200 D100" is implemented by the macro-program as shown in FIG. 12.

"INC"—"INC" is the function instruction which has the function of adding (incrementing) 1 to the content of an identified data register.

For example, "INC D800" instructs the addition of 1 to the content of the data register defined as D800.

After the intermediate language file is generated, compiler 209 converts each element of the intermediate language file 211b into a machine language with reference to an intermediate language/machine language conversion table 210a, and inputs the results to a main processing program 204 in the memory 2 as an "execution file" comprising CPU instructions. The ladder program thus written in a ladder language is converted into a CPU 1 executable machine language file and is stored into the main processing program 204 in the memory 2.

The machine language, which is represented by 0's and 1's, is the only representation that a computer can recognize but is not suitable for easy understanding by man. In the present description, therefore, the machine language is divided on a four-bit basis and the four bits are represented in hexadecimal (HEXA).

In FIG. 10, a macroprogram file 206 contains programs stored in the PC, which have been written separately in advance as shown in FIG. 12 in a C language for achieving function instructions, translated into the machine language by the compiler, and stored in the memory 2 as existing programs.

The head addresses of these programs are stored in a jump table 205 and a transition to a desired program can be made by referring to the jump table 205.

FIG. 12 shows a macroprogram designed to accomplish a MOVE function of the PC which transfers data stored in a memory area having a first-specified data number to a memory area having a next-specified data number.

Unless otherwise noted, instructions employed in describing the following program are written in an assembler language for use with the CPU 1 and the assembler language is translated by the compiler into the machine language, i.e., instructions with which the CPU 1 operates. In the present specification, the PC instruction and intermediate language are described in UPPERCASE and the assembler language in lowercase for ease of identification.

When a corresponding macroprogram is called, the content of a stack pointer "sp", which stores a memory 2 address and is located next to the address where a function instruction used to call such macroprogram is stored, is first read to a register a0 in step 1.

In step 2, it is checked whether a condition for executing the MOVE instruction of the PC, i.e., relay contact information, is 1 or not.

The position of this flag to be checked is fixed by the PC hardware and is herein bit 0 of an address specified by FLAG.

If the result of this check is 0, the execution branches to step 6. If the check result is 1, the execution advances to step 3.

In step 3, a register needed for the processing is cleared.

In step 4, the data number of a transfer source specified attendantly on the MOVE function instruction of the PC is first fetched and the head address of a data table is then read. The head address of the data table is then added to the data number, thereby finding a memory address of the data number of the transfer source. Finally, data stored at the resultant memory address is read to a register d0.

As in step 4, the data number of a transfer destination is fetched and the head address of the data table is added to the data number in step 5, thereby obtaining a memory address of the data number, of the transfer destination. Finally, data stored in the register d0 is written to the memory address found.

In step 6, 8 (one byte) is added to match the stack pointer with an address where a next-valid PC instruction is stored.

FIG. 11 shows a program structure and a control sequence in the conventional PC, and combines the execution file and jump table in the machine language created by the program conversion illustrated in FIG. 10 and the machine language file, such as the macroprogram, which achieves the MOVE function, etc., illustrated in FIG. 12.

In the structure shown in FIG. 11, high-speed processing is executed by the reference interrupt signal, NC processing is then performed, and sequence processing is thereafter resumed from where the main processing program had been stopped. The cycle is repeated to carry out control by the control apparatus combining the NC and PC.

If, during the execution of the main processing program, the CPU 1 specifies, for example, a memory 2 address where a PC function instruction of MOVE D200 D100 (actually, this instruction written in the machine language and stored in the memory is three-step information, beginning with a code having a jump function, which is represented 4EAD02B0 in HEXA) is stored, the code stored at the corresponding address is read and output onto the data bus 4. Since this code is not a basic instruction, the bit operation instruction detector 5 controls the selector 8 so that the code output onto the data bus 4 is output onto the system data bus 10.

Accordingly, the code 4EAD02B0 is read to the CPU I, which further judges that the code is a function instruction from the 16-bit code of 4EAD. The CPU 1 refers to information on the MOVE instruction stored starting at an address offset by 02B0 output to the 16 least significant bits of the code, beginning at the head address specified in the jump table. The head address is an absolute address in the memory 2 where the macro program for the targeted MOVE function and the attributes of the macroprogram are stored.

By transferring control from the instruction to the absolute address where the macroprogram for the targeted MOVE function is stored and executing an instruction group as shown in FIG. 11 in sequence, starting at that absolute address, the CPU 1 transmits data from a transfer source data number designated in the sequence program to a designated transfer destination data number.

When the macroprogram has been executed to the end, the CPU 1 specified a memory 2 address indicated by the stack pointer updated by the postprocessing of the macroprogram, i.e., a memory 2 address where an instruction next to the just executed MOVE function instruction of the PC in the sequence program is stored, and continues the decoding and execution of instructions.

Meanwhile, when the sequence program is diplayed, a machine language/ladder information conversion program (converter) 212a is employed to read and analyze the first instruction information of the main processing program 204. These instruction include information on relationships between the machine language and ladder language and information on the lengths of corresponding instructions. Reference to a machine language/ladder language conversion table 213a according to corresponding information provides a corresponding ladder language and a memory address where a next-read instruction exists. For instance, the code "4EAD02B0" reveals that it is JSR $02B0, i.e., an instruction of three steps long, "MOVE, data transfer source number, data transfer destination number." The data transfer source number and data transfer destination number are stored in the second and third steps. According to this information, predetermined graphic information may be added to the format of the MOV instruction and the result output to the CRT.

Therefore, by causing the converter 212a to read instructions from the beginning of the sequence program stored in the main processing program 204 in sequence and to convert the instructions into the ladder language in accordance with the machine language/ladder language conversion table 213a, the machine language written in the main processing program area 204 can be displayed on the display device as a ladder diagram.

The conventional PC designed as described above has certain disadvantages:

To execute a single "function instruction", a procedure for accomplishing a predetermined function must be preprogrammed and a large number of processing steps in a macroprogram stored in the memory 2 must be executed. In addition, a step for extracting the storage address of the macroprogram is needed before the program is reached. Hence, a high-level sequence program employing many function instructions will be executed longer and respond slower.

Also, if the CPU instructions of "move (a1), d0" in the step 4 and "move d0, (a1)" in the step 5 as shown in FIG. 12 are combined or integrated to generate a move instruction which directly designates memory addresses, processing speed increases but these instructions must be manually programmed in the assembler language. Also, these instructions do not include information required for restoration to the original ladder language, disallowing ladder display.

SUMMARY OF THE INVENTION

It is accordingly an object of the present invention to overcome the disadvantages in the conventional design by providing a programmable controller which solves the above problems.

A first embodiment of the present invention provides a programmable controller which converts PC instructions into minimum units of CPU instructions, stores restoration information for ladder diagram display in a memory together with the CPU instructions, and runs a sequence program by executing the CPU instructions, and further displays a ladder diagram by analyzing the restoration information.

The present invention also provides a programmable controller as defined above, wherein conversion programs, conversion tables and a restoration information control program for conversion from the PC instructions to the CPU instructions are stored, whereby sequence programs can be developed directly.

The present invention further provides a programmable controller wherein the conversion tables for conversion from the PC instructions to the CPU instructions can be edited from an interactive input such as a CRT/keyboard attached to the PC.

The present invention also provides a modification of the first embodiment wherein the programmable controller stores restoration information for ladder diagram display in a memory, converts PC instructions into minimum units of CPU instructions and stores them in the memory separately from the restoration information.

A second embodiment of the present invention comprises a programmable controller which generates restoration information for ladder diagram display obtained by conversion from a sequence program, converts PC instructions into minimum units of CPU instructions, generates an execution file separately from the restoration information, stores the file in a memory, and runs a sequence program by executing said CPU instructions.

The second programmable controller embodiment stores conversion programs, conversion tables and a restoration information control program for conversion from the PC instructions to the CPU instructions, whereby sequence program can be developed directly without employing a separate computer.

DESCRIPTION OF THE PREFERRED EMBODIMENTS

Figure 1:
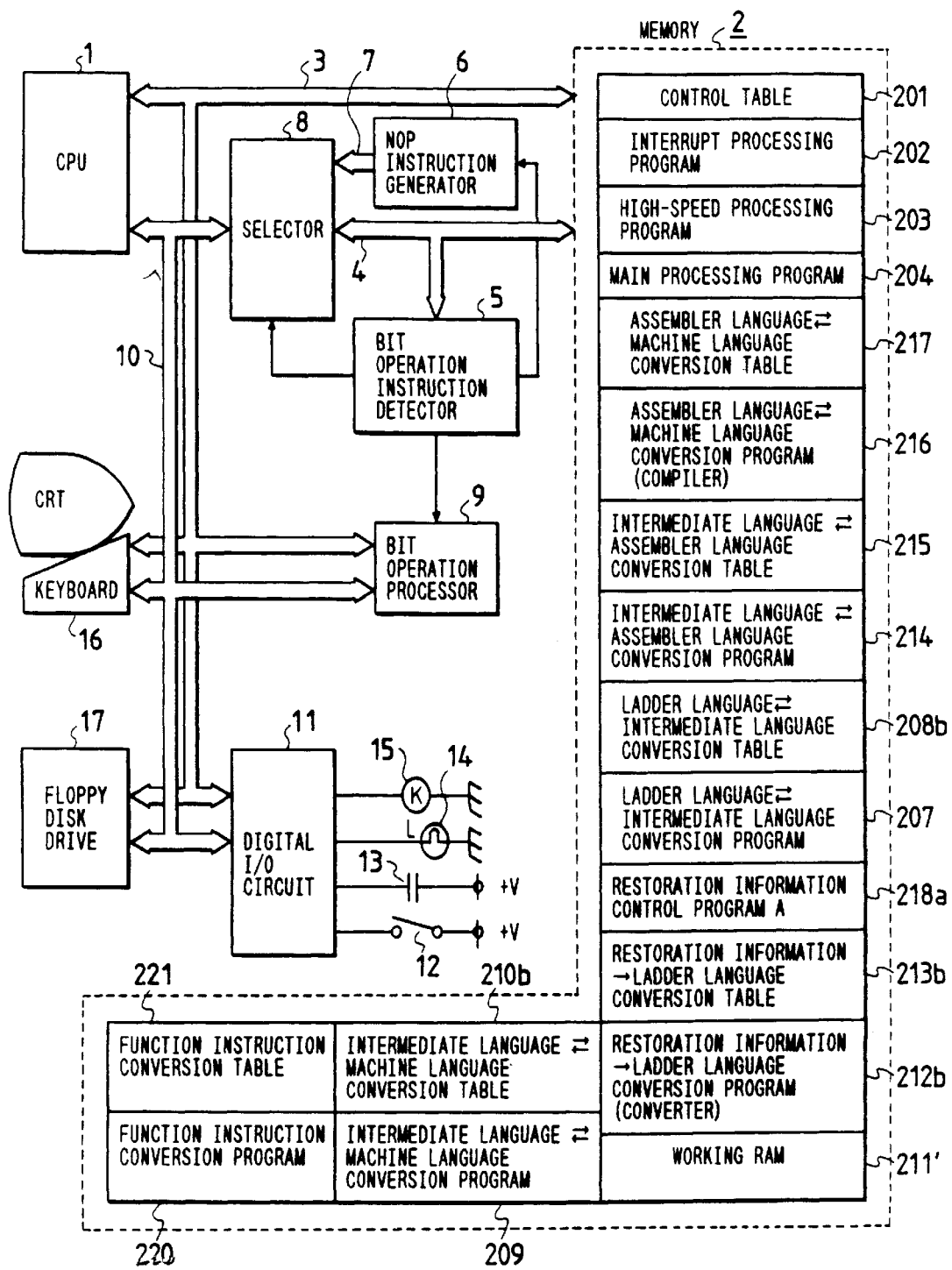
FIG. 1 is a configuration diagram in accordance with a preferred embodiment of the present invention.
Figure 9:
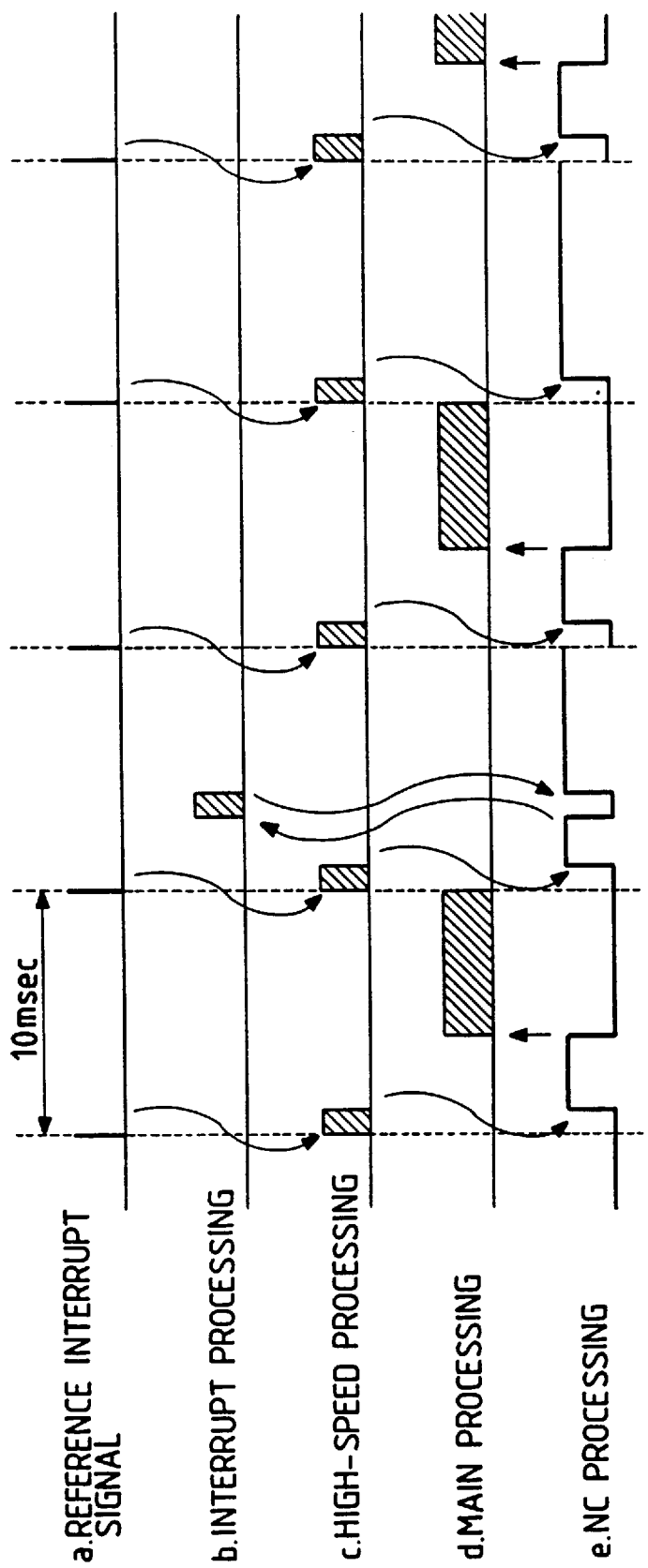
FIG. 9 is a PC and NC processing timing chart in a numerical control apparatus.
Figure 10:
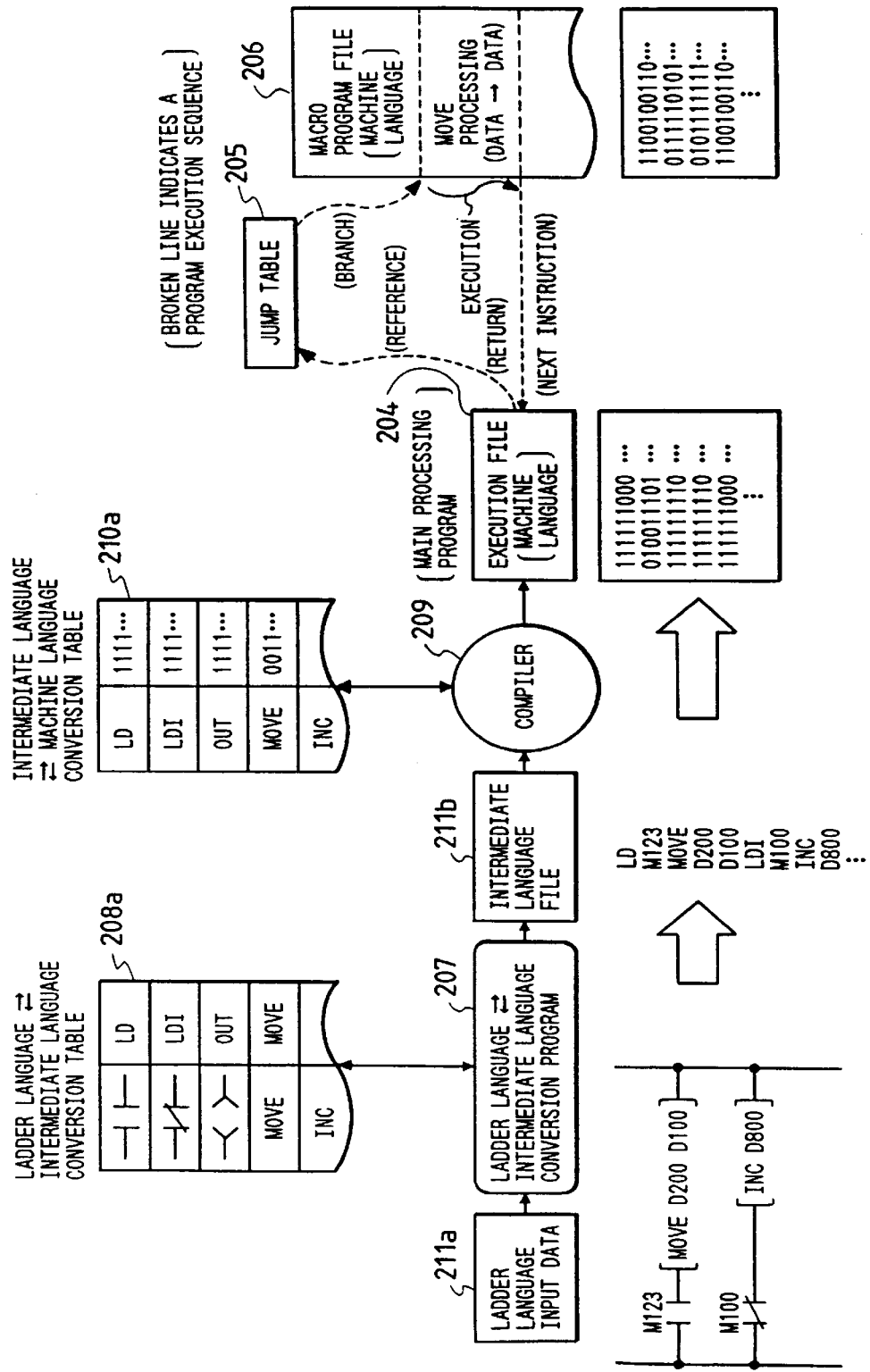
FIG. 10 illustrates a conventional program conversion known in the art.
Figure 11:
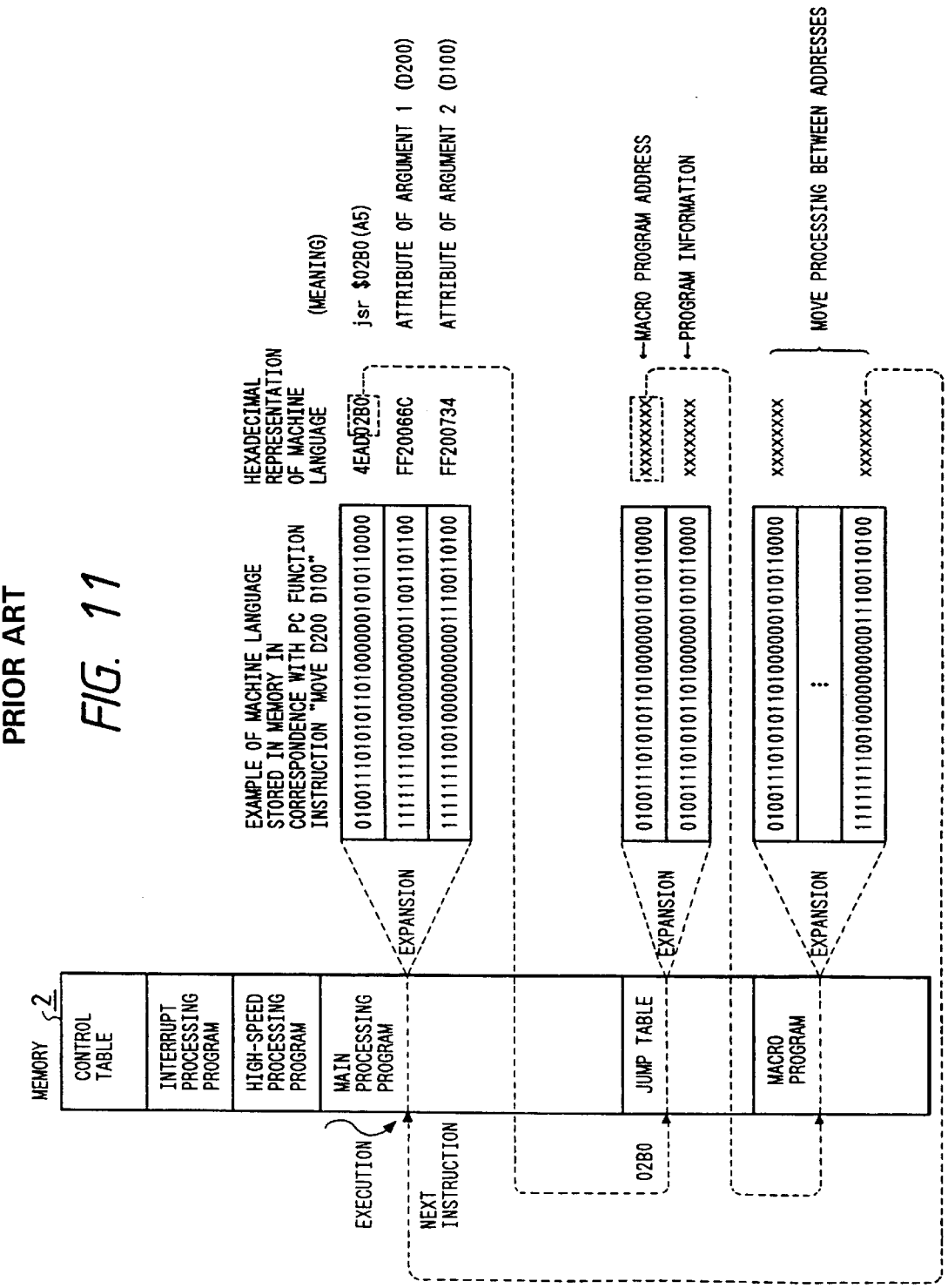
FIG. 11 provides a data move flowchart, example and a microprogram example.

A first embodiment of the present invention will now be described with reference to FIG. 1 to FIG. 4. FIG. 1, which is a configuration diagram illustrating an embodiment of the PC in accordance with the present invention, is identical to FIG. 9 with the exception of the structure of the memory 2. Hence, the non-memory parts are identified by identical numerals and will not be described here.

The memory 2 is constructed as described below. The numeral 201 indicates a control table for storing data necessary for program processing of the PC, 202 an interrupt processing program for carrying out processing, e.g., immediate reading of coordinate data started by an interrupt signal or the like in measuring operation, etc., 203 a high-speed processing program, 211' a working RAM for storing data which may change in the progress of operation, 212b a restoration information/ladder language conversion program (converter), 213b a restoration information/ladder language conversion table, 207 a ladder language/intermediate language conversion program, 208b a ladder language/intermediate language conversion table, 209 an intermediate language/machine language conversion program (compiler), 210b an intermediate language/machine language conversion table, 214 an intermediate language/assembler language conversion program, 215 an intermediate language/assembler language conversion table, 216 an assembler language/machine language conversion program (compiler), 217 an assembler language/machine language conversion table, 204 a main processing program for storing machine language information according to the present invention, and 218a a restoration information control program.

It will be noted that the preferred embodiment of FIG. 1 uses an assembler language in a manner that is not found in the background art, although such language is well known.

Conventionally, when the function instruction of the PC is read, the macroprogram, written beforehand as a control program consisting of the CPU instructions in correspondence with the function instructions of the PC, is executed to implement the corresponding function. To achieve the specified function, the macroprogram consists of steps such as initial setting, execution enable/disable judgment, register clear, data read, operation processing, data write and postprocessing. To increase developmental efficiency, such macroprograms are developed by (i) writing the program in the assembler language so that an operator can see and understand it and then (ii) compiling it into the machine language by means of the compiler. The machine language is written beforehand in the macroprogram area of the PC memory. When the function instruction of the PC is read from the user-written main processing program, the CPU implements the corresponding function by reading and executing a sequence of machine language written in the macroprogram area corresponding to the function instruction.

Based on the above described process, it may be said that the assembler language is also used in the conventional PC. However, the assembler language is used to develop the control programs such as the macroprogram of the PC. Namely, if the control program written in the assembler language is compiled into the machine language by the compiler, the steps for achieving the functions, such as initial setting, execution enable/disable judgment, register clear, data read, operation processing, data write and postprocessing, cannot be omitted. Accordingly, a number of steps written in the machine language which corresponds to the number of steps written in the assembler language is required. Therefore, when the function instruction is read from the main processing program of the PC, a corresponding number of machine steps must be executed to implement the corresponding function. Given this requirement, the function instruction cannot be executed at high speed.

As opposed to the above, the present invention employs the assembler language to generate an execution file from a ladder program, such as the main processing program written by the PC user. That is, a minimum unit of instructions prepared beforehand in the assembler language in correspondence with each of the PC instructions is combined with restoration information which can be restored to each of the PC instructions to generate the assembler language file. This assembler language file is compiled into the machine language by the compiler, thereby generating the execution file.

Such process almost eliminates the steps required for the conventional macroprogram, e.g., initial setting, execution enable/disable judgment, register clear, data read, operation processing, data write and postprocessing, integrating the program into the execution enable/disable judgment instruction and the intended minimum unit of instructions. Accordingly, since the final number of program steps reduces sharply, the function instructions can be executed at high speed.

Program conversion and control sequences in the PC of the present invention will now be described with reference to FIGS. 2 and 3, which illustrate a program conversion sequence in the PC of the present invention and a program structure and a control sequence in the PC of the present invention, respectively.

Figure 2:
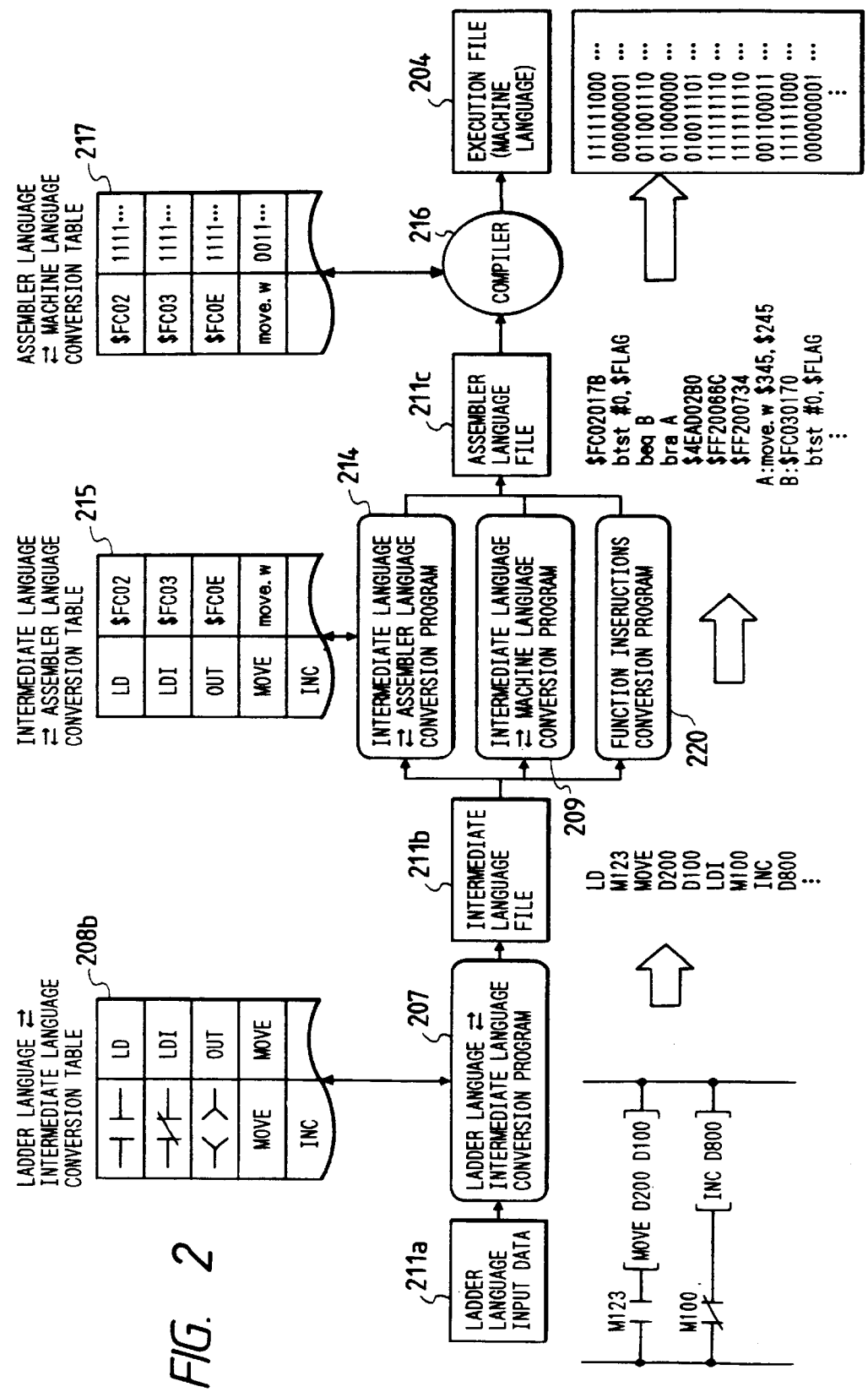
FIG. 2 illustrates a program conversion sequence in is the present invention.

Referring to FIG. 2, 211a indicates ladder language input data. In accordance with a ladder diagram displayed below the ladder language input data, an operator operates the keyboard/CRT 16 in FIG. 1 to enter a sequence program into the working RAM 211' as ladder language input data. The ladder language/intermediate language conversion program 207 converts instructions into an intermedate language separated into subdivided elements with reference to the ladder language/intermediate language conversion table 208b and generates an intermediate language file 211b in the working RAM 211'.

In the example illustrated in FIG. 2, the CPU instructions (on the assembler language file in FIG. 2) use the following terms: "btst"—The term is the instruction which means "bit test"(test a bit).

In "btst #D, SA" this instruction tests the content of bit 0 at the memory address indicated by SA and sets the result to the condition code. If the content of bit 0 is "0", the condition code is set to, for example, "1". Conversely, if the content of bit 0 is "1", the condition code is set to "0". When the branch instruction is further executed at the next step, the result of "btst" executed previously is checked by the condition code. For example, if "1", has been set, the execution branches to the memory address defined by the label specified by "B", in "beg B". If "0" has been set, the next unconditional branch Instruction "bra A" is executed, the step consisting of three lines including "4EAD02B0" is skipped, and "move. w $345, $245" beginning with the label "A," is executed. As described above, the combination of the "btet" instruction and the "beg" instruction allows the execution to be branched to two processings depending on the status of the bit at the specified memory address. "move"—The term is an instruction which transfers information.

In an instruction "move. w $C, $D" ( "move. w #345, $245" in this example) the term is used to transfer oneword (word =2 bytes =16 bits) information from the memory address specified by "$C" to two bytes starting at the memory address specified by "$D". In this instruction, the values of $C and $D defined as the transfer source and the transfer destination, respectively, are determined by the control program of the CPU and cannot be specified directly in the PC instruction.

Figure 12:
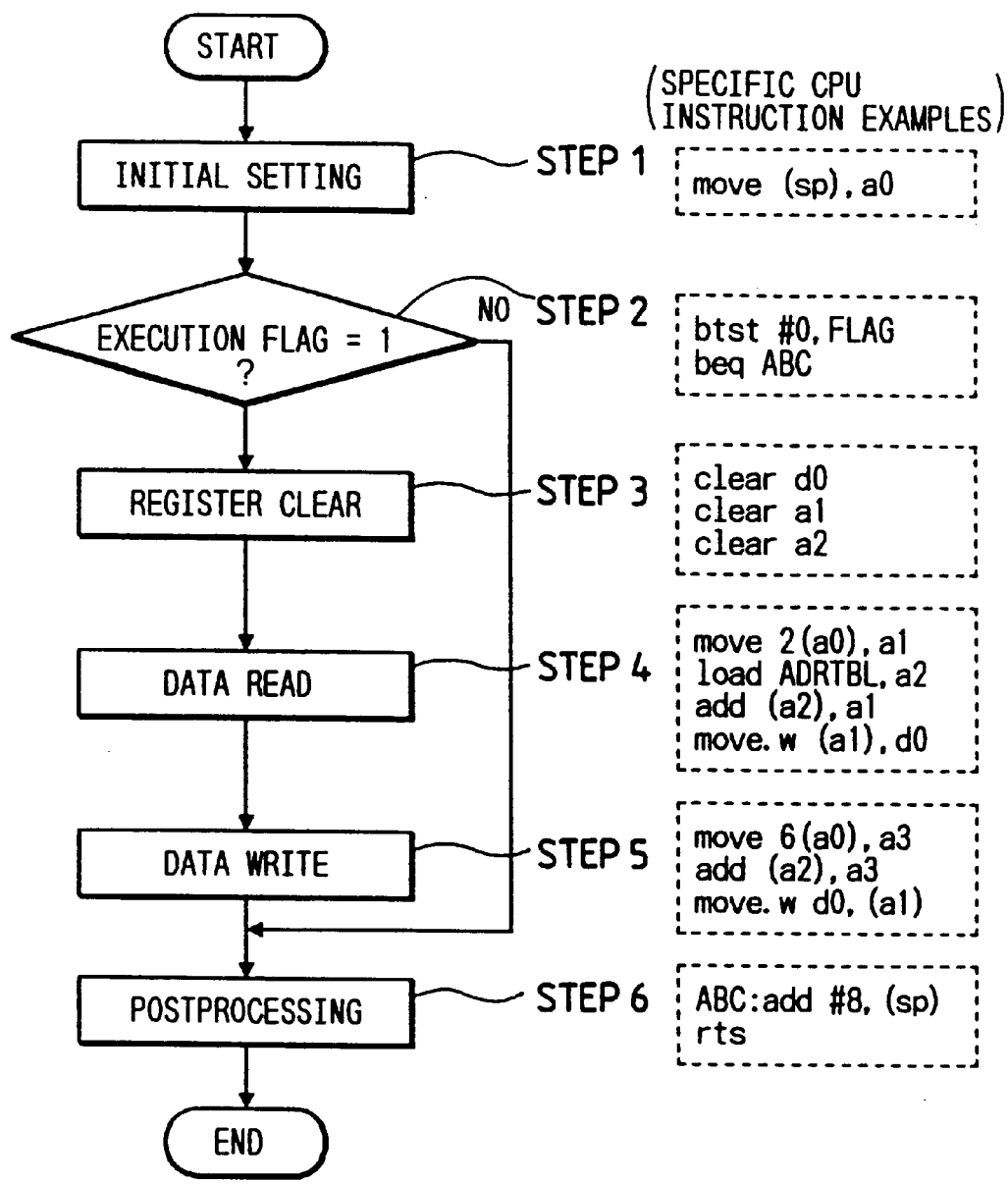
FIG. 12 illustrates a conventional program structure and a control sequence known in the art.

For the above reason, a macroprogram consisting of a large number of CPU instructions as shown in FIG. 12 and operating equivalently to the "move. w $345, $245" instruction, may be prepared beforehand as a control program inside the PC. Such program may be used optionally by the PC operator to implement the function of the MOVE instruction. If the "MOVE D200 D100" instruction is read during the execution of the PC program, control is exercised to run the macroprogram, and as a result, data is transferred from the data register D200 to the data register D100 specified in the MOVE instruction.

Accordingly, for example, if the MOVE instruction has been converted into the "move. w" instruction and this one-step instruction is executed, processing equivalent to the execution of the many CPU instructions used at step 1 and steps 3 to 6 shown in FIG. 12 can be executed at high speed.

The intermediate language/assembler language conversion program 214 converts the instructions into an assembler language with reference to the intermediate language/ assembler language conversion table 215 and generates an assembler language file 211c in the working RAM 211'.

The compiler 216 then converts the instructions of the assembler language file 211c into a machine language with reference to the assembler language/machine language conversion table 217 and enters them into the main processing program area 204 of the memory 2 as an "execution file". The sequence program written in the ladder language is thus converted into a CPU 1 executable machine language file and stored into the main processing program 204 in the memory 2.

The ladder language/intermediate language conversion table 208b is fundamentally identical to the ladder language/ intermediate language conversion table 208a in the background art. An intermediate language/machine language conversion table 210b also is included in memory 2, as seen in FIG. 1, and also is fundamentally the same as table 210a. One significant difference is that data correction and addition can be made to the conversion tables of the present invention by an operator using the CRT/keyboard 16.

Specifically, the ladder language/intermediate language conversion table 208b and the intermediate language/machine language conversion table 210b are stored in an electrically rewritable RAM area. When the operator operates the CRT/keyboard 16 to activate an edit program (not shown), any table, e.g., the ladder language indicated on the left-hand side of the ladder language/intermediate language conversion table 208b and corresponding intermediate language indicated on the right-hand side n FIG. 2, is displayed on a CRT screen in a list format.

With this arrangement, interactive modification of the tables is convenient. By selecting a "change mode", choosing a desired element, and inputting new corresponding information, the table can be modified. By selecting a "registration mode" and inputting the intermediate language corresponding to the ladder language, a new PC instruction can be added.

The intermediate language/assembler language conversion table 215 and the assembler language/machine language conversion table 217 are also stored in the electrically rewritable RAM area, and are designed to allow the operator to correct and add data from the CRT/keyboard 16, as in the ladder language/intermediate language conversion table 208b.

In an actual operation, using the CRT/keyboard 16, the operator presses soft keys corresponding to ladder language symbols displayed on the CRT or alphanumeric keys corresponding to mnemonic codes, thereby entering a ladder diagram. Every time a single line of the ladder diagram is entered, ladder language information is written to the ladder language input data 211a.

The ladder language/intermediate language conversion program 207 reads a ladder program from the ladder language input data 211a sequentially, converts instructions into the intermediate language separated into subdivided elements with reference to the ladder language/intormediate language conversion program 208b, and generates the intermediate language file 211b in the working RAM 211'.

The Intermediate language/assembler language conversion program 214 first reads instructions converted into the intermediate language from the intermediate language file 211b in the working RAM 211' of the memory 2 and fetches assembler instructions corresponding to the instructions from the intermediate language/assembler language conversion table 215.

The intermediate language/assembler language conversion table 215 contains pre-written PC instructions, PC instruction development information corresponding to the PC instructions, data numbers, and conversion information such so addresses in the memory 2 corresponding to the data numbers, and outputs corresponding assembler language information according to an input instruction or component element.

Hence, the PC function instruction of "MOVE D200 D100 " is converted into an assembly language having the form "move. w SC, SD" (in the example,. C=345 and D=245 are memory addresses corresponding to D200 and D100, respectively).

As described above, the intermediate language/assembler language conversion program 214 sequentially writes to the assembler language file 211c the assembler language information output from the intermediate language/assembler language conversion table 215.

The assembler language /machine language conversion program (compiler) 216 reads assembler language information sequentially from the assembler language file 211c in the working RAM 211' of the memory 2 and converts the assembler language information into the machine language with reference to the assembler language/machine language conversion table 217.

The assembler language/machine language conversion table 217 contains pre-written, CPU-decodable machine language information corresponding to a variety of assembler language information. The compiler 216 outputs the assembler language information as an "execution file" written in a sequence of executable machine language codes on the basis of the machine language information output from the assembler language/machine language conversion table 217 according to the assembler language information entered, and writes it to the main processing program 204 in the memory 2.

As described previously, the assembler language/machine language conversion table 217 is written in RAM and is designed to allow the operator to correct and add data from the CRT/keyboard 16, ensuring ease of modification in response to increases in PC instructions.

The operation of a first restoration information control program 218a (hereinafter referred to as the "restoration information control program A") will now be described.

In ladder language input processing, as the ladder language is converted into the machine language, the restoration information control program-A 218a in FIG. 1 reads the intermediate language on a step-by-step basis from the intermediate language file 211b in step 11 as shown in a ladder language input processing flowchart FIG. 4(a).

Namely, it is checked in step 10 whether the conversion of the one-line ladder language program into the assembler language program is complete or not. If the conversion is complete, the execution branches to step 19, where the assembler language file 211c in the working RAM 211' described later is compiled by the assembler language/machine language conversion program 216, the result of the compilation is written to the main processing program 204, and the conversion processing of the one-line ladder language program ends.

If it has been determined in step 10 that the conversion is not yet complete, the execution advances to step 11, where a sequence of intermediate language corresponding to the one-line ladder language program is read from the intermediate language file 211b in the working RAM 211'.

In step 12, it is determined whether or not the intermediate language read in step 11 is a "function instruction". This determination is made by checking whether corresponding information is a predetermined mnemonic code, such as INC or MOVE. If the information read in the step 12 is a function instruction, the execution proceeds to step 13.

In step 13, the function instruction conversion program 220 reads from the function instruction conversion. table 221 an execution judgment instruction (btst #0, $FLAG) and branch instructions (beg B and bra A) corresponding to the PC function instruction read in step 11 (here, for example, MOVE D200 D100) and writes them to the assembler language file 211c in the working RAM 211'.

In step 14, the function instruction in intermediate language is converted into the machine language. This is accomplished by the intermediate language/machine language conversion program 209 with reference to the intermediate language/machine language conversion table 210b on the basis of the sequence of the intermediate language read in step 11. The machine language is written in step 15 as restoration information to a position subsequent to the execution judgment instruction and branch instructions in the assembler language file 211c.

Figure 3:
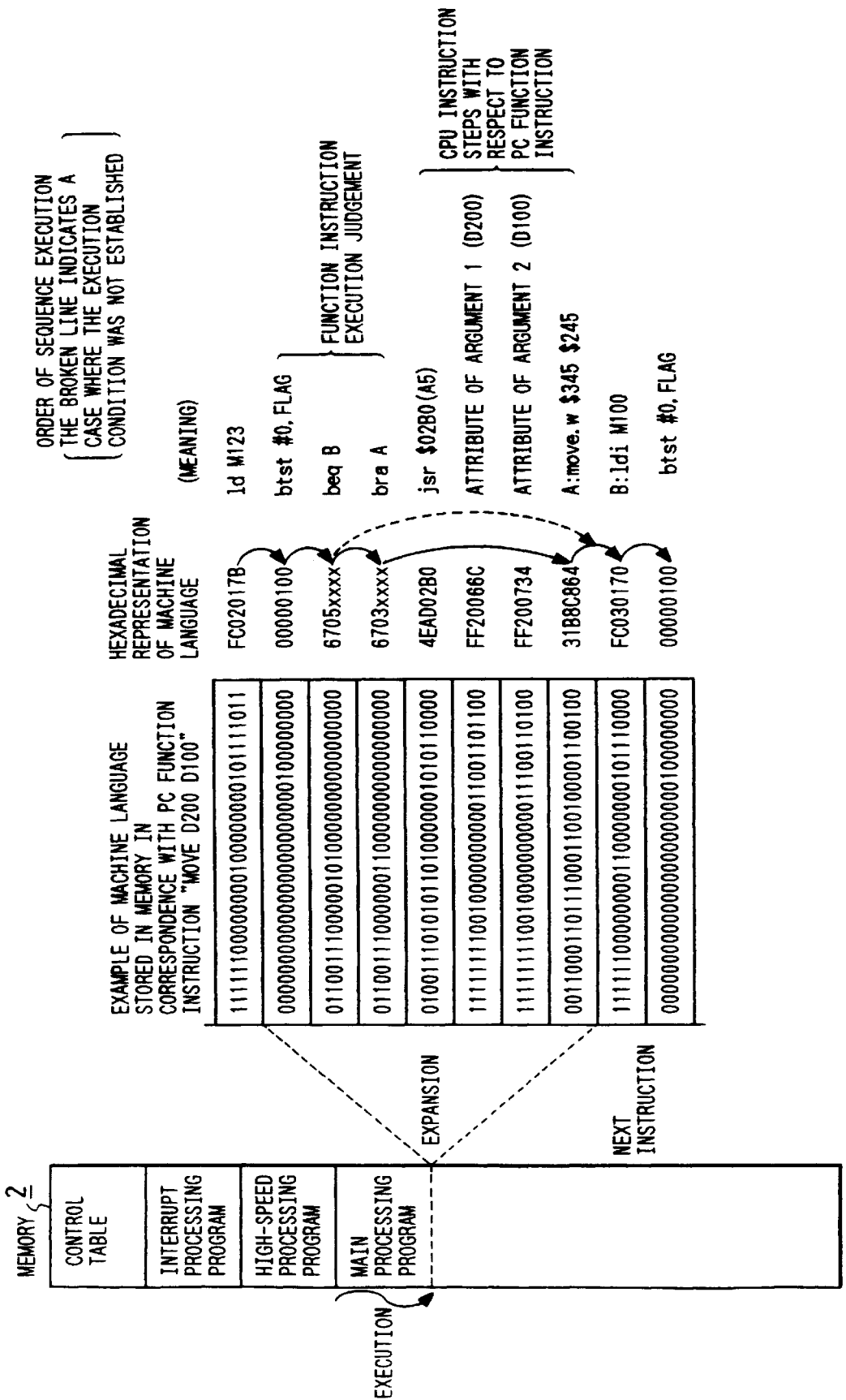
FIG. 3 illustrates a program structure and a control sequence in the present invention.
Figure 4:
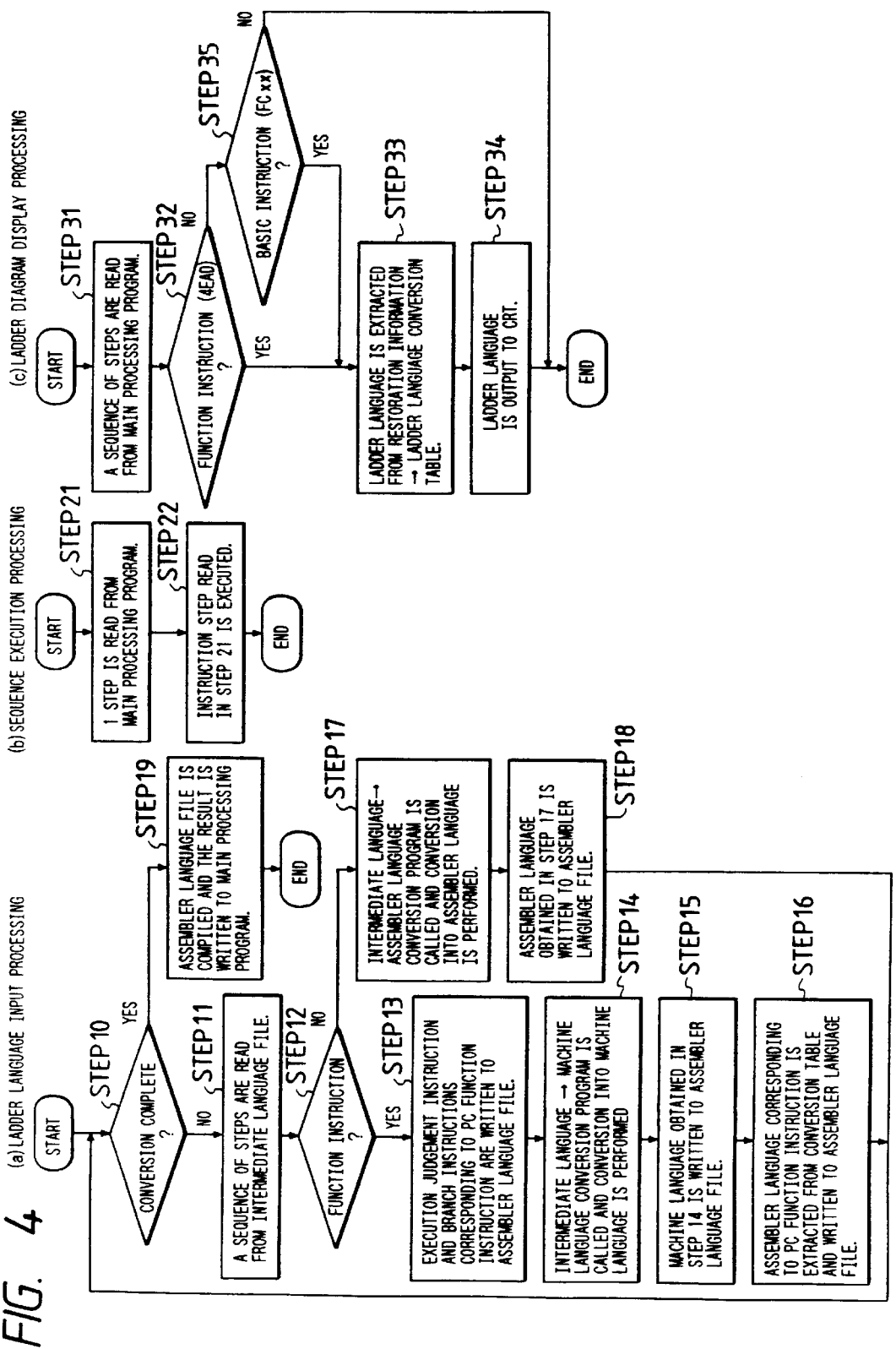
FIG. 4 is a flowchart for a first restoration information control program (restoration information control program A) in the present invention.

In this case, the CPU instruction step is equivalent to the three lines including the CPU instruction step "jsr $02B (A5)" shown on the right of FIG. 3.

In step 16, the assembler language as the execution instruction is extracted by the intermediate language/ assembler language conversion program 214 and written to the assembler language file 211c. This CPU instruction step in assembler language is equivalent to the CPU instruction step "move. w $345 $245" shown on the right of FIG. 3.

If it has been determined in step 12 that the instruction read is not a function instruction, the execution progresses to step 17, where the corresponding assembler language is extracted from the intermediate language/assembler language conversion table 215 by the intermediate language/ assembler language conversion program 214. The extracted assembler language is written to the assembler language file 211c in the working RAM 211' in step 18.

As a result of this process, the written PC instruction is converted into a constant and the device addresses (such as D100, D200 ) are. converted into variables.

In the execution of the main processing program, the restoration information control program 218a operates as described below.

As shown in a sequence execution processing flowchart in FIG. 4(b), a code in one step is read from the main processing program 204 in step 21.

In step 22, the instruction step read in step 21 is executed and the processing of one stop is terminated.

When the main processing program is displayed as a ladder diagram, the operation of the restoration information control program 218a is as follows. As shown in a ladder diagram display processing flowchart in FIG. 4(c), a code in one step is read from the main processing program 204 in step 31.

In step 32, it is determined whether the code read in step 31 is a "function instruction" or not. This determination is made by checking whether the 16 most significant bits of the code read are "4EAD" or not, if it is determined that the information read in the step 31 is a "function instruction", the execution progresses to step 33.

In the step 33, the restoration information/ladder language conversion program 212b converts the machine language into the ladder language with reference to the restoration information/ladder language conversion table 213b.

Specifically, when, for example, "4EAD02B0" is read, its 16 most significant bits "EAD" indicate a "function instruction" and the 16 least significant bits are fetched. Since the code representing the 16 least significant bits is "02B0", a format of "MOVE D D" corresponding to "02B0" is fetched from the restoration information/ladder language conversion table 213b.

A next step is then read and "200" corresponding to "066C" in the 16 least significant bits (four digits) of "FF20066C" is specified as a value of the first D in the format.

Further, a next step is read and "100" corresponding to "0734" in the 16 least significant bits of "FF200734" is embedded as a value of the second D in the format.

In step 34, the ladder language obtained in step 33 is output to the CRT/keyboard 16 and displayed as a ladder diagram.

If it has been determined in the step 32 that the 16 most significant bits of the code read are not "4EAD", the execution advances to step 35, where it is judged whether or not the step is a "basic PC instruction" or a "bit operation instruction". This is similarly judged by checking whether the eight most significant bits of the code read are "FC" or not. If the step is determined to be a basic instruction, the execution moves on to the steps 33 and 34, where the processing as performed for the PC "function instruction" is carried out.

If it has been determined in the step 35 that the step read is not a basic PC instruction either, the processing is terminated without conversion processing.

The above control allows the ladder language to be stored into the main processing program 204 in the memory 2 as restoration information in correspondence with the machine language corresponding to the PC instructions, it also permits a ladder display to be provided by reading the restoration information from the sequence program stored in the main processing program 204 in the memory 2 and restoring it to the ladder language.

FIG. 3 shows a program structure and a control sequence in the PC of the present invention, and the practical execution status of the main processing program shown in FIG. 3 will be described. It should be noted that as in FIG. 9, the memory width is also represented and described in 32 bits in FIG. 3 for convenience.

When the execution of various processing programs higher in priority than the main processing program ends, sequence processing is resumed from where the main processing program had been stopped.

Now assume that while the main processing program is being run, the CPU 1 executes, for example, a program which constitutes a single line of the ladder diagram shown below the ladder language input data 211a illustrated in FIG. 2.

This program is accomplished by two instructions: LD M123 . . . . Reads the contents of bit information M123. MOVE D200 D100 . . . . Transfers the contents of D200 to D100.

LD M123 is a bit operation instruction of the PC and is stored, for example, as a code of "FC02017B". MOVE D200 D100 is a function instruction of the PC. It is first checked whether a condition for executing the move instruction has been established or not.

This check is performed by executing a btst instruction which checks whether the execution result of said LD M123 is 1 or not. If the result is 0, a branch instruction in a next step is executed and the processing moves to the execution of a next PC instruction.

Conversely, if the result is 1, a "jsr" instruction is executed. This "jsr" instruction is restoration information, is judged as a function instruction by the sequence execution processing of the restoration information control program A 218a, and the content of the stack pointer is updated on the basis of the number of instruction steps included in this instruction. This control causes the restoration information to be skipped and the "move" instruction to be executed.

This ends the processing of the one line in the ladder diagram and the execution moves to an instruction on a next line.

Operation for ladder display will now be described. Ladder display control is carried out by the restoration information control program A 218a. For ladder display, sequence processing is not executed. Ladder display is achieved by sequentially reading and restoring the CPU instructions stored in the main processing program 204 to the ladder language and outputting a ladder diagram to the display device, such as the CRT 16.

Hence, referring to FIG. 3, a series of CPU instructions stored in the main processing program 204 and beginning with "FC02017B" taken as an example are read by the restoration information control program A 218a sequentially.

Assuming that the code of "FC02017B" has been read, the code of the 16 most significant bits is judged as shown in the step 32 of the ladder diagram display processing in FIG. 4(c).

In this case, since the code of the 16 most significant bits is not a function instruction of "4EAD", the execution advances to the step 35, where it is determined whether or not the code of the eight most significant bits is "FC" representing a basic instruction.

Since the code is "FC" in this case, it is judged as a basic function and the execution progresses to the step 33, the restoration information/ladder language conversion program (converter) 212b is called, a corresponding ladder language code "LD M123" is fetched from the restoration information/ladder language conversion table 213b according to information following the "FC" code, and the ladder language code is then output to the CRT 16 in the step 34.

Since the 16 most significant bits of the information in a next step are a code of "6004", "No" is given in either of the steps 32 and 35 and the processing is terminated without conversion and output to the CRT, Since the 16 most significant bits of the information in a next step are a code of "4EAD", the information is judged as a function instruction in the stop 32 and the execution proceeds to the step 33.

In the step 33, a 16 least significant bit code "02B0" following the 16 most significant bit code "4EAD" provides a corresponding MOVE instruction according to the restoration information/ladder language conversion table 213b, and further the information of the next two steps "FF20066C" and "FF200734" provides numbers of D200 and D100, According to this information, the corresponding instruction information "MOVE D200 D100"of the PC is output in the ladder language to the CRT 16 in the stop 34.

Also, since the 16 most significant bits of the information in a next step are a code of "31B8", "No" is given in either of th e steps 32 and 35 and the processing is terminated without conversion and output to the CRT.

This ends the processing of the single line in the ladder diagram and the execution transfers to reading of a next line. In this manner, the CPU instructions stored in the main processing program 204 are executed as a sequence program and displayed as a ladder diagram.

Another embodiment of the present invention will now be described with reference to FIG. 5 to FIG. 7.

Having the functions of a restoration information control program B described below, the second embodiment first generates a restoration information file written in the machine language, then generates foam the restoration information file an execution file comprising CPU instructions by means of an intermediate language/machine language conversion program, an intermediate language/assembler language conversion program and an assembler language/machine language conversion program.

Figure 5:
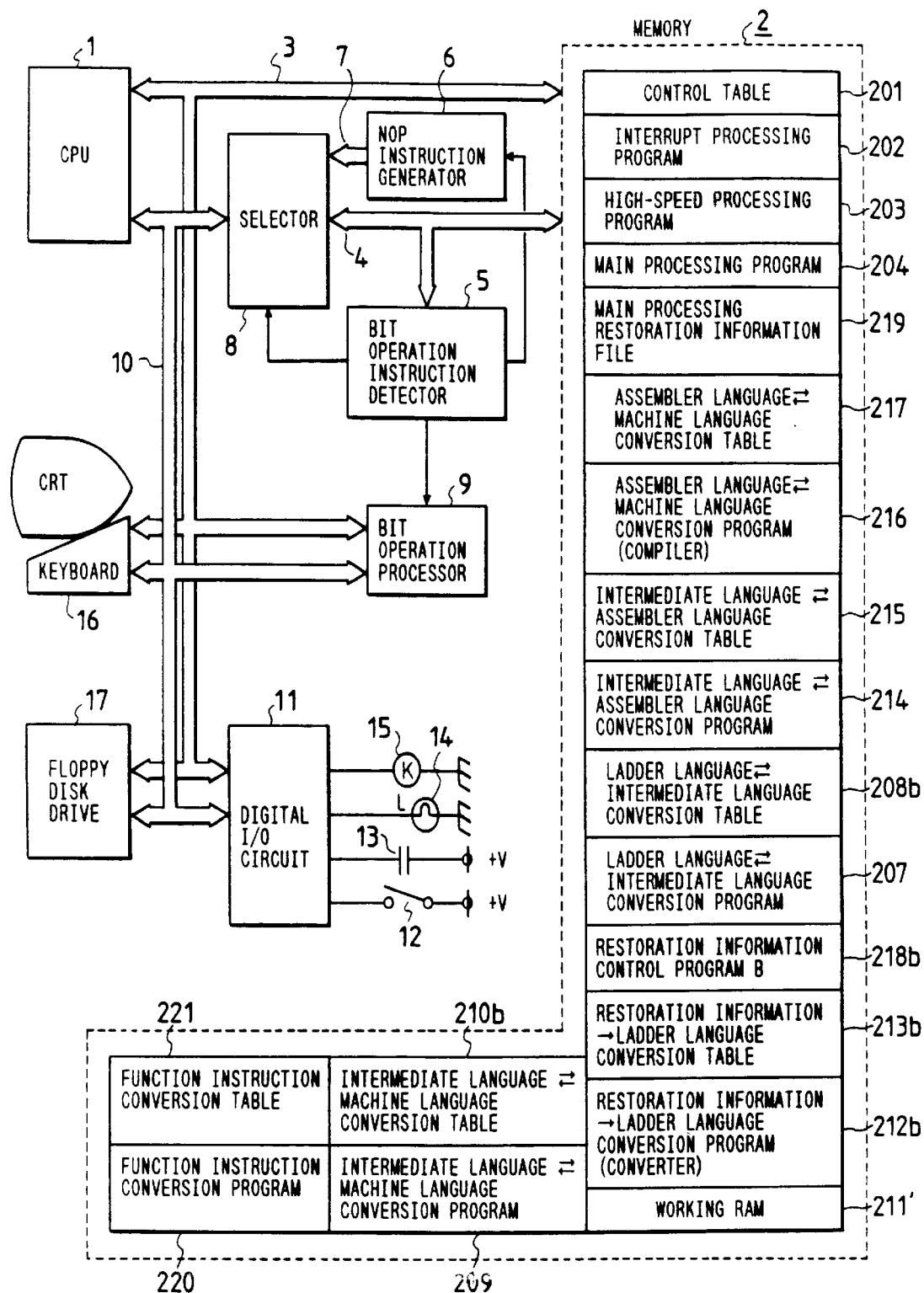
FIG. 5 is a configuration diagram in accordance with another preferred embodiment of the present invention.

FIG. 5, which is a configuration diagram illustrating another embodiment of the PC in accordance with the present invention, is identical to FIG. 1 with the exception that the first restoration information control program (restoration information control program A) 218a is replaced by a second restoration information control program 218b and that there is an added main processing restoration information file 219. Therefore, the parts are provided with identical reference characters and will not be described here.

The second restoration information control programs 218b (hereinafter referred to as the "restoration information control program B") comprises two programs as shown in a flowchart for the restoration information control program B in FIG. 7.

In ladder languaqe input processing, one step is read in step 41 from the intermediate language file 211b already generated.

In step 42, it is determined whether information read above is a function instruction or not. If the information is a function instruction, the execution proceeds to step 43.

In the step 43, the intermediate language/machine language conversion program 209 is called and converts the information read in said step 41 from the intermediate language to the machine language in accordance with the intermediate language/machine language conversion table 210b.

If, for example, the information is "MOVE D200 D100", it is judged as a first MOVE and function instruction and further the two following arguments are headed by D. Hence, "4EAD" is judged as an instruction for moving data between data numbers and corresponding "02B0" is output.

Also, "D200" and "D100" are similarly converted into corresponding "FF20066C" and "FF200734" respectively and output.

In step 44, the machine language obtained in said step 43 is written sequentially to the main processing restoration information file 219 as restoration information.

If it has been determined that the information read in the step 41 is not a function instruction, it is further determined in step 45 whether or not that information is a basic instruction for performing bit processing.

For example, it is judged whether or not said information is an "LD" instruction, an LDI instruction or the like. If it is a basic instruction, the processing in the steps 43 and 44 is carried out.

If it has been determined in said step 45 that the information is a basic instruction, the "LD" instruction, for example, is converted into corresponding "FC02" and "M123" into "017B" in the step 43, and they are written sequentially to the main processing restoration information file 219 in the step 44.

Operation for ladder display will now be described.

As shown in a ladder diagram display processing flowchart in FIG. 7(b), a code in one step is read from the main processing restoration information file 219 in step 51.

In step 52, it is determined whether the code read in said step 51 is a function instruction or not. This determination is made by checking whether the 16 most significant bits of the code read are "4EAD" or not. If it is determined that the information read in the step 51 is a function instruction, the execution progresses to step 53.

In the step 53, the restoration information/ladder language conversion program 212b converts the restoration information into the ladder language with reference to the restoration information/ladder language conversion table 213b.

Specifically, when, for example, "4EAD02B0" is read, its 16 most significant bits "4EAD" indicate a function instruction and the 16 least significant bits are fetched. Since the code representing said 16 bits is "02B0", a format of "MOVE D D" corresponding to "02B0" is fetched from the machine language/ladder language conversion table.

A next step is then read and "200" corresponding to "066C" in the 16 least significant bits (four digits) of "FF20066C" is embedded as a value of the first D in said format.

Further, a next step is read and "100" corresponding to "0734" in the 16 least significant bits of "FF200734" is embedded as a value of the second D in said format.

In step 54, the ladder language obtained in said step 53 is output to the CRT/keyboard 16 and displayed as a ladder diagram.

If it has been determined in the step 52 that the Lo most significant bits of the code read are not "4EAD", the execution advances to step 55 and it is judged whether or not the step is a basic instruction or a bit operation instruction. This is similarly judged by checking whether the eight most significant bits of the code read is "PC" or not. If the step is deter mined to be a basic instruction, the execution advances to the steps 53 and 54, where the processing as performed for the function instruction is carried out.

If it has been determined in the step 55 that the step read is not a basic instruction either, the processing is terminated without conversion processing.

The above control allows the ladder language to be stored as restoration information into the main processing restoration information file 219 in the memory 2 independently of the machine language corresponding to the PC instructions, and ladder display to be provided by reading the restoration information stored in the main processing restoration information file 219 in the memory 2 and restoring it to the ladder language.

Figure 7:
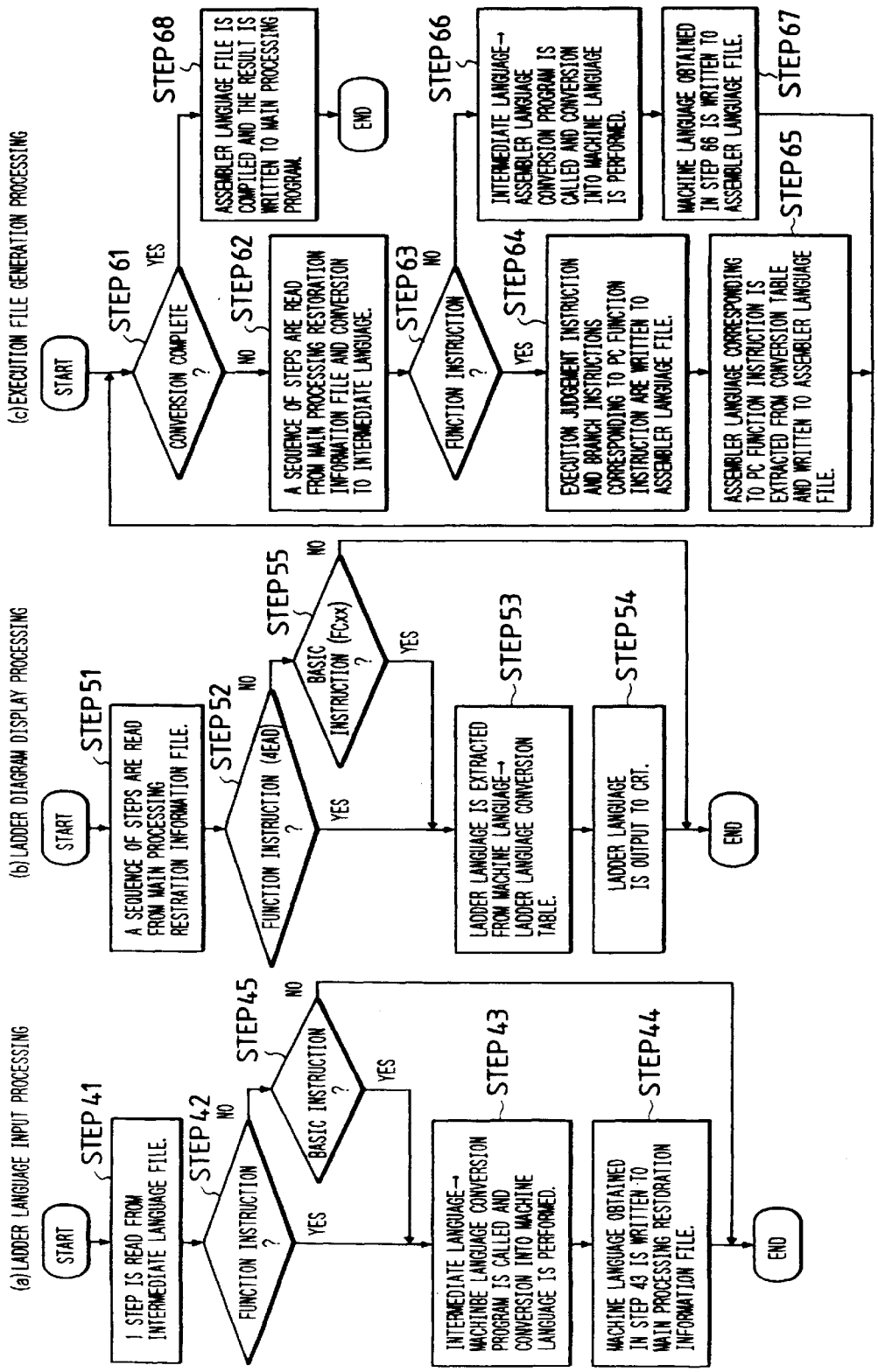
FIG. 7 is a flowchart for a second restoration information control program (restoration information control program B) in another preferred embodiment of the present invention.
Figure 8:
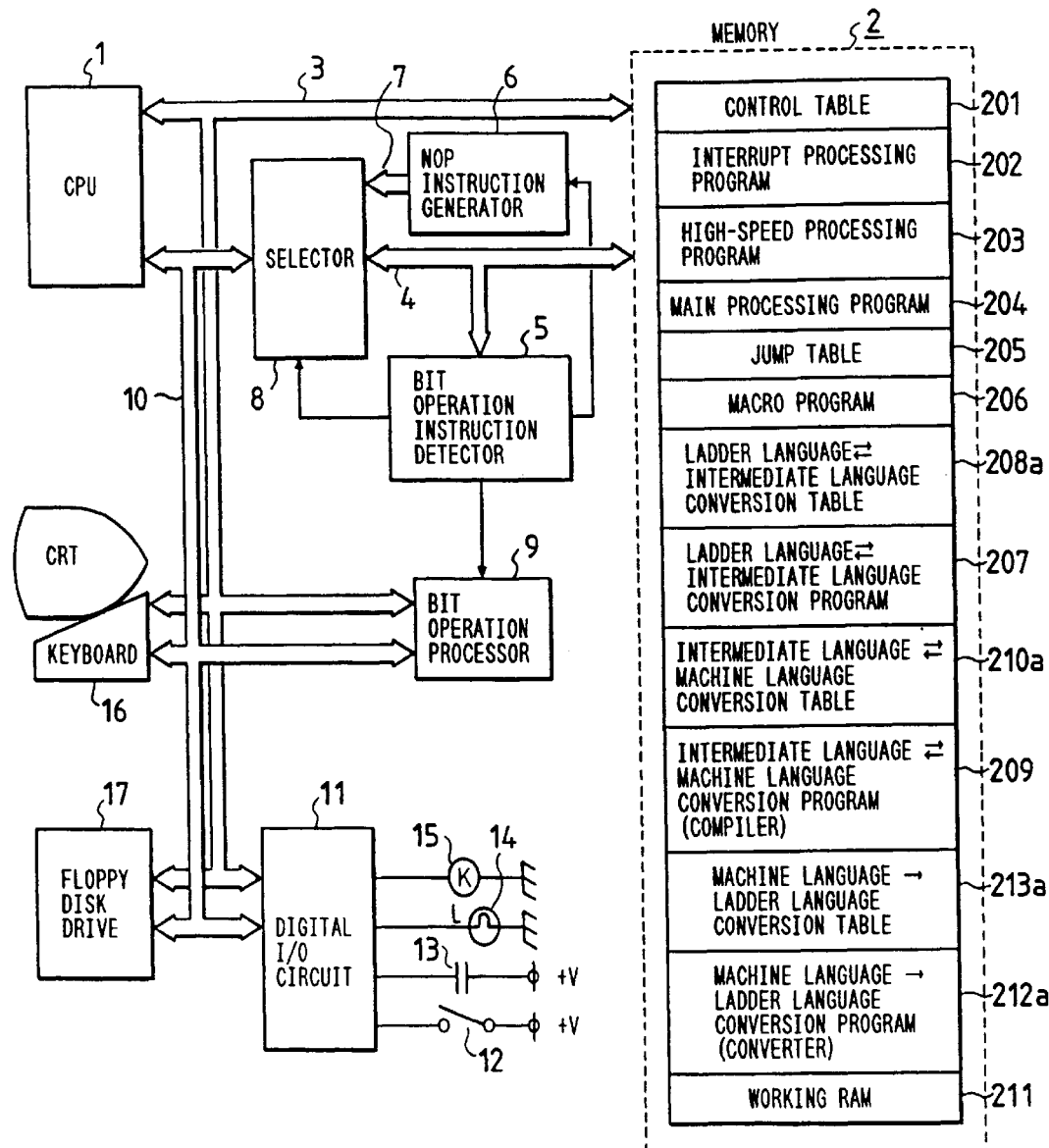
FIG. 8 is a configuration diagram of a PC known in the art.

The main processing program 204, as the execution file, is generated as indicated in "execution file generation processing" in FIG. 7 (c).

First, it is checked in step 61 whether the conversion of the intermediate language into the assembler language is complete or not, if the conversion is not yet complete, the execution proceeds to step 62, where a sequence of instruction steps are read from the intermediate language file 211b.

In step 63, it is determined whether the intermediate language read in step 62 is a "function instruction" or not. If it has been determined to be a function instruction, the execution moves on to step 64, where the function Instruction conversion program 220 is executed and the corresponding execution judgment instruction and branch instructions are written from the function instruction conversion table 221 to the assembler language file 211c in the working RAM 211'.

In step 65, the function instruction conversion program 220 is executed to extract the assembler language corresponding to the function instruction from the function instruction conversion table 221 and write the corresponding execution instructions to the assembler language file 211c in the working RAM 211'. The execution then returns to step 61, where the next intermediate language is checked.

If it has been determined in step 63 that the intermediate language is not a function instruction, the execution branches to step 66, where the corresponding assembler language is extracted from the intermediate language/ assembler language conversion table 215 by the intermediate language/assembler language conversion program 214. Then, In step 67, the extracted assembler language in written to the assembler language file 211c in the working RAM 211'. When the intermediate language is not a function instruction, the processing ends after these two steps and returns to step 61.

If it has been determined in step 61 that the conversion is complete because the predetermined intermediate language in the intermediate language file 211b in the working RAM 211' has all been converted, the execution branches to step 68, where the assembler language file 211c in the working RAM 211' is compiled by the assembler language/machine language conversion program 216 and the machine language as the execution instructions is written to the main processing program 204 as the execution file, and the generation of the execution file is terminated.

As described above, the ladder language input data stored as the intermediate language is converted into the CPU instructions as the execution instructions and stored into the execution file.

The sequence control operation is performed by reading the CPU instructions stored in the main processing program 204 acting as the execution file in sequence from the beginning and by executing them by means of the CPU.

Figure 6:
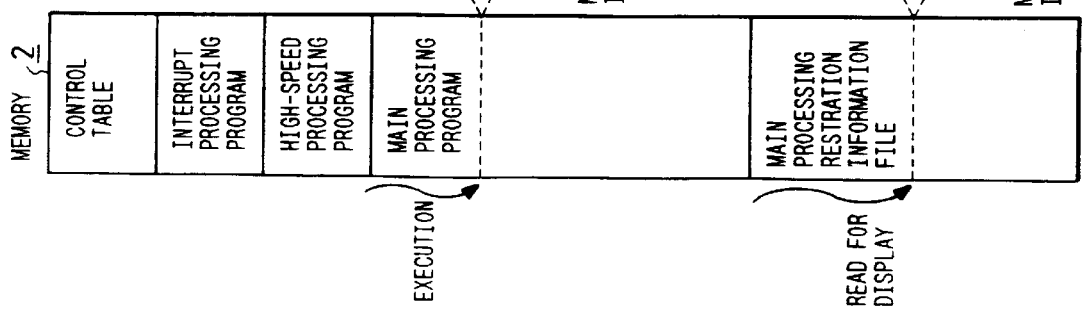
FIG. 6 illustrates a program structure and a control sequence in another preferred embodiment of the present invention.

FIG. 6 shows a program structure and a control sequence in the PC according to the second embodiment of the present invention, and the actual execution status of the main processing program shown in FIG. 6 will now be described. It should be noted that, as in FIG. 9, the memory width in FIG. 6 is also represented and described in 32 bits for convenience.

FIG. 6 is different from FIG. 3 in that the program is divided into the main processing program in sequence processing and the ladder display file as described previously.

Now assume that while the main processing program is being run, the CPU 1 executes, for example, a program which constitutes one line of the ladder diagram shown below the ladder language input data 211a illustrated in FIG. 2.

This program is achieved by two instructions:

LD M123 —Reads the contents of bit information M123.

MOVE D200 D100—Transfers the contents of D200 to D100 .

LD M123 is a bit operation instruction of the PC and is stored, for example, as a code of "FC02017B". MOVE D200 D100 is a function instruction of the PC. It is first checked whether a condition for executing the move instruction has been established or not.

This check is performed by executing a btst instruction which checks whether the execution result of said LD M123 is 1 or not. If the result is 0, a branch instruction at a next step is executed and the processing moves to the execution of a next PC instruction.

Conversely, if the result is 1, a move instruction is executed.

This ends the processing of the one line in the ladder diagram and the execution moves to an instruction on a next line.

Operation for ladder display will now be described. Ladder display control is performed by the restoration information control program B 218b. For ladder display, sequence processing is not performed. Ladder display is achieved by sequentially reading and restoring the restoration information stored in the main processing restoration information file 219 to the ladder language and outputting a ladder diagram to the display device, such as the CRT 16.

Accordingly, a sequence of restoration information stored in the main processing restoration information file 219 and beginning with "FC02017B" taken as an example is read by the restoration information control program B 218b sequentially.

Assuming that the code of "FC02017B" has been read the code of the 16 most significant bits is judged as shown in the step 52 of the ladder diagram display processing in FIG. 7(b).

In this case, since the code of the 16 most significant bits is not a "function instruction" of "4EAD" the execution proceeds to the step 55, where it is determined whether or not the code of the eight most significant bits is "FC" representing a "basic instruction".

Since the code is "FC" in this case, it 1s judged as a basic function and the execution moves to the step 53, the restoration information/ladder language conversion program (converter) 212b is called, a corresponding ladder language code "LD M123" is fetched from the restoration information/ladder language conversion table 213b according to information following "FC", and the ladder language code is then output to the CRT 16 in the step 54.

Since the 16 most significant bits of the information in a next step are a code of "4EAD", the information is judged as a function instruction in the step. 52 and the execution progresses to the step 53.

In the step 53, a 16 least significant bit code "02B0" following the 16 most significant bit code "4EAD" provides a corresponding MOVE instruction according to the restoration information/ladder language conversion table 213b, and further the information of the next two steps "FF20066C" and "FF200734" provides data number of D200 and D100. According to this information, the corresponding PC instruction information "MOVE D200 D100" is output in the ladder language to the CRT 16 in the step 54.

This ends the processing of the single line in the ladder diagram and the execution transfers to reading of a next line. In this manner, the CPU instructions stored in the main processing program 204 are executed as a sequence program, and the restoration information stored in the main processing restoration information file 219 is displayed as a ladder diagram.

As described above, the ladder display information is generated as the main processing restoration information file 219 independently of the sequence program. Hence, the sequence, processing and ladder display processing can be separated completely, ensuring ease of management.

Also, when a sequence program is modified, a ladder diagram restored from the restoration information file is displayed and corrected, and the execution file of the sequence program can then be obtained using the various conversion programs, whereby manual programming in the assembler language need not be performed and programming errors can be reduced considerably.

It will be appreciated that the above described embodiments, as applied to the main processing program, may be used with the interrupt processing and high-speed processing programs.

It will also be appreciated that in place of the machine language/ladder language conversion table and the machine language/ladder language conversion program of the background art, which required storage of display information in the execution file, the PC instructions may be converted into ASCII codes or the like and used with additional display processing information.

It will further be appreciated that while conversion from the ladder language to the machine language is all processed on the PC in the above described embodiments, the results may be converted beforehand employing another processor and may be input from a floppy disk drive 17 to the memory 2.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A programmable controller (PC) having a CPU and being operative to execute a sequence program, comprising a plurality of PC instructions comprising basic instructions for carrying out bit operations and function instructions for performing operation-transfer processing, and to display said PC instructions in ladder language form on a display means, comprising:

means for storing at least one assembler language instruction having a function equivalent to a macro program;

conversion means for converting each of said plurality of PC instructions into a unit of CPU instructions in a first language, said unit of CPU instructions comprising at least one instruction of said CPU which can execute said PC instructions without requiring use of the macro program, wherein a PC instruction which requires use of the function equivalent to the macro program for its execution is converted to a unit of CPU instructions including information related to the function equivalent to the macro program so that the CPU instructions can be executed without reference to the macro program, and for converting each of said plurality of PC instructions into restoration information, which can be restored to said ladder language, in said first language, said conversion means comprising memory means for storing an execution file comprising said PC instructions and said restoration information in said first language; and restoration information control means for (a) reading and executing said CPU instructions from said execution file of said memory means but skipping said restoration information without execution when the sequence program is executed, and (b) analyzing said restoration information read from said execution file of said memory means, restoring said information to ladder language, and controlling the display of the sequence program as a ladder diagram.

2. The programmable controller as set forth in claim 1, further comprising:

a ladder language/intermediate language conversion means for converting ladder language input data into an intermediate language which is a character string indicating each element of the ladder language;

an intermediate language/assembler language conversion means for converting said intermediate language into an assembler language corresponding to said intermediate language;

an assembler language/machine language conversion means for generating a first machine language file, which is an execution file of the sequence program, from said assembler language;

an intermediate language/machine language conversion means for converting said intermediate language into a second machine language file acting as restoration information corresponding to said intermediate language and for writing said second machine language to a specified position of said memory means;

a ladder language/restoration information conversion means for establishing a corespondence between the ladder language and said restoration information for restoration to the original ladder language and for obtaining said ladder language or restoration information from input information; and wherein said execution file storing said CPU instructions corresponding to the steps of said sequence program and said restoration information attendant on said instructions is internally generated and stored into said memory means.

3. The programmable controller as set forth in claim 2, further comprising an interactive input means, wherein addition/correction can be made to at least one of said ladder language/intermediate language conversion means, said intermediate language/assembler language conversion means, said assembler language/machine language conversion means and said ladder language/restoration information conversion means by edit operation from said interactive input means.

4. The programmable controller as set forth in claim 1, further comprising an input means for making addition/correction to at least one of said ladder language/intermediate language conversion table, said intermediate language/assembler language conversion table, said assembler language/machine language conversion table and said ladder language/restoration information conversion table by an edit operation.

5. A programmable controller operative in response to a sequence program, which comprises a plurality of PC instructions that may be represented in a ladder language, comprising:

means for storing at least one assembler language instruction having a function equivalent to a macro program;

means for converting each of said sequence program PC instruction into restoration information which can restored to said ladder language and for generating a restoration information file;

means for converting said restoration information stored in said restoration information file into CPU instructions for a CPU which can execute said PC instructions and generating an execution file, wherein a PC instruction which requires use of the function equivalent to the macro program for its execution is converted to a unit of CPU instructions including information related to the function equivalent to the macro program so that the CPU instructions can be executed without reference to the macro program;

memory means for storing said restoration information file and said execution file;

restoration information control means for reading and executing CPU instructions from said execution file of said memory means when the sequence program is executed, and restoring the restoration information read from said restoration information file of the memory to the ladder language; and means responsive to said restoration information control means for displaying the sequence program as a ladder diagram.

6. The programmable controller as set forth in claim 5, comprising at least one of:

a ladder language/intermediate language conversion table for converting ladder language input data into an intermediate language which is a character string indicating each element of the ladder language;

a ladder language/intermediate language conversion program for converting the ladder language input data into the intermediate language, which is a character string indicating each element of the ladder language, using said ladder language/intermediate language conversion table, and outputting the result to an intermediate language file;

an intermediate language/assembler language conversion table for converting the intermediate language converted from the ladder language into an assembler language corresponding to said intermediate language;

an intermediate language/assembler language conversion program for generating an assembler language file from the intermediate language file using said intermediate language/assembler language conversion table;

an assembler language/machine language conversion table for outputting from the assembler language converted from the intermediate language a machine language corresponding to said assembler language;

an assembler language/machine language conversion program for generating a machine language file, which is an execution file of the sequence program, from the assembler language file using said assembler language/machine language conversion table;

an intermediate language/machine language conversion table for converting the intermediate language converted from the ladder language into the machine language acting as restoration information corresponding to said intermediate language;

an intermediate language/machine language conversion program for writing machine language information serving as said restoration information from the intermediate language file to a specified position of the memory using said intermediate language/machine language conversion table;

a ladder language/restoration information conversion table for establishing a correspondence between the ladder language and said restoration information for restoration to the original ladder language;

a ladder language/restoration information conversion program for obtaining the ladder language or restoration information from input information using said ladder language/restoration information conversion table; and wherein the restoration information file is generated employing the restoration information corresponding to instruction steps constituting said sequence program, and the execution file comprising the CPU instructions corresponding to the steps of said sequence program is generated using any of said conversion program and conversion table on the basis of said restoration information file and is stored into the internal memory.

7. A programmable controller (PC), operative in response to a sequence program, comprising a series of PC instructions, which may be represented in an original language and may be executed as CPU instructions, comprising:

means for storing at least one assembler language instruction having a function equivalent to a macro program;

means for converting said PC instructions into said CPU instructions and into restoration information, said restoration information being restorable to said original language, wherein a PC instruction which requires use of the function equivalent to the macro Program for its execution is converted to a unit of CPU instructions including information related to the function equivalent to the macro program so that the CPU instructions can be executed without reference to the macro program;

restoration information memory means for storing said restoration information as a restoration file;

execution memory means for storing execution information, comprising said CPU instructions, as an execution file;

means for converting said restoration information stored in said restoration information memory into CPU instructions for a CPU which can execute said PC instructions and for generating an execution file, said converting means being operative to delete said restoration information file and to store said execution file; and wherein said CPU instructions are read from said execution file of said execution memory means and executed when the sequence program is executed.

8. The programmable controller as set forth in claim 7, further comprising display means responsive to information in said restoration information memory means for displaying said original language.

9. The programmable controller as set forth in claim 8, further comprising an input means for making addition/correction to at least one of said ladder language/intermediate language conversion table, said intermediate language/assembler language conversion table, said assembler language/machine language conversion table and said ladder language/restoration information conversion table by an edit operation.

10. The programmable controller as set forth in claim 7, wherein said original language is a ladder language.

11. The programmable controller as set forth in claim 7, wherein said restoration information and said CPU instructions are stored together in said restoration information memory means.

12. The programmable controller as set forth in claim 7, wherein said CPU instructions are stored in both said restoration information memory means and said execution memory means.

13. The programmable controller as set forth in claim 7, comprising:

at least one conversion table and/or conversion program out of the following:

a ladder language/intermediate language conversion table for converting ladder language input data into an intermediate language which is a character string indicating each element of the ladder language;

a ladder language/intermediate language conversion program for converting the ladder language input data into the intermediate language, which is a character string indicating each element of the ladder language, using said ladder language/intermediate language conversion table, and outputting the result to an intermediate language file;

an intermediate language/assembler language conversion table for converting the intermediate language converted from the ladder language into an assembler language corresponding to said intermediate language;

an intermediate language/assembler language conversion program for generating an assembler language file from the intermediate language file using said intermediate language/assembler language conversion table;

an assembler language/machine language conversion table for outputting from the assembler language converted from the intermediate language a machine language corresponding to said assembler language;

an assembler language/machine language conversion program for generating a machine language file, which is an execution file of the sequence program, from the assembler language file using said assembler language/machine language conversion table;

an intermediate language/machine language conversion table for converting the intermediate language converted from the ladder language into the machine language acting as restoration information corresponding to said intermediate language; and an intermediate language/machine language conversion program for writing machine language information serving as the restoration information from the intermediate language file to a specified position of the memory using said intermediate language/machine language conversion table.

14. The method of operating a programmable controller (PC) in response to a sequence program having a plurality of PC instructions composed of basic instructions and functional instructions, said PC being operative to display said PC instructions in ladder form, comprising:

a. converting said PC instructions into CPU instructions in assembler language and into restoration information in assembler language, said restoration information being changeable to a format for displaying said sequence program in ladder form wherein a PC instruction which requires use of a function equivalent to a macro program for its execution is converted to a unit of CPU instructions so as to include information related to the function equivalent to the macro program so that the CPU instructions can be executed without reference to the macro program;

b. storing said CPU instructions along with said restoration information in an assembler language file;

c. compiling said assembler language file into a machine language;

d. storing said machine language in an execution file; and e. accessing said execution file for at least one of
 1. executing said sequence program in accordance with the machine language converted from said assembler language; and
 2. displaying said sequence program by restoring said restoration information to the ladder language.

15. The method of operating a PC as set forth in claim 14, wherein said assembler language preparation is performed beforehand.

16. The method of operating a PC as set forth in claim 14, wherein said restoration information comprises ladder language converted into character data.

17. The method of operating a PC as set forth in claim 14, wherein only one of said restoration information and said execution instructions are stored.

18. The method of operating a PC as set forth in claim 14, further comprising:

identifying which of said restoration information is identical to said machine language in execution instruction form; and storing only one of said identical restoration information on the basis of said identifying step.

* * * * *